United States Patent [19]

Shimizu et al.

[11] 3,819,481

[45] June 25, 1974

[54] PROCESS FOR PREPARING NICOTINAMIDE ADENINE DINUCLEOTIDE PHOSPHATE

[75] Inventors: Yoshiaki Shimizu; Yoshiyuki Akiyama; Toshio Tatano, all of Shizuoka-ken, Japan

[73] Assignee: Kyowa Hakko Kogyo Kabushiki Kaisha, Tokyo, Japan

[22] Filed: Oct. 18, 1971

[21] Appl. No.: 190,413

[30] Foreign Application Priority Data
Oct. 27, 1970   Japan.................................. 45-93911

[52] U.S. Cl............................................ 195/28 N
[51] Int. Cl............................................. C12d 13/06
[58] Field of Search............... 195/28 N, 66 R, 66 A

[56] References Cited
UNITED STATES PATENTS

| | | | |
|---|---|---|---|
| 3,243,354 | 3/1966 | Nakao et al. | 195/28 N |
| 3,345,269 | 10/1967 | Hofsten | 195/66 R |
| 3,594,282 | 7/1971 | Kagawa et al. | 195/66 A |
| 3,627,639 | 12/1971 | Tanaka et al. | 195/66 A |

OTHER PUBLICATIONS

J. Biol. Chem., Vol. 211, pages 465–472 (1954).
J. Biol. Chem., Vol. 182, pages 805–813 (1950).

*Primary Examiner*—Alvin E. Tanenholtz
*Attorney, Agent, or Firm*—Phillips, Moore, Weissenberger, Lempio & Strabala

[57] ABSTRACT

A process for preparing nicotinamide adenine dinucleotide phosphate (NADP) by reacting nicotinamide adenine dinucleotide with adenosine triphosphate in the presence of nicotinamide adenine dinucleotide (NAD) kinase. The NAD kinase may be in the crude form and appreciable quantities of NADP are produced if the reaction takes place in the presence of fluoride and/or an organic sulf-hydral (SH) radical containing reagent. Good production also is achieved if the crude NAD kinase is treated with a mineral acid prior to the reaction. Exceptionally good yields are achieved if an acid-pretreated NAD kinase is used and both fluoride and an SH reagent are present during the reaction.

15 Claims, No Drawings

PROCESS FOR PREPARING NICOTINAMIDE ADENINE DINUCLEOTIDE PHOSPHATE

BACKGROUND OF THE INVENTION

The present invention relates to improvements in the production of nicotinamide adenine dinucleotide triphosphate (hereinafter designated as NADP). It is well known to those skilled in the art that NADP can be produced by the reaction of nicotinamide adenine dinucleotide (hereinafter designated as NAD) with adenosine triphosphate (hereinafter designated as ATP) in the presence of nicotinamide adenine dinucleotide kinase (hereinafter designated as NAD kinase). However, this process has the disadvantage that NAD kinase used in the reaction must have a very high purity in order to obtain NADP in a high conversion ratio of the reaction material into the final product. If the NAD kinase used in the conversion is not sufficiently purified, the reaction material decomposes quite readily due to the presence of phosphotase, resulting in a poor conversion ratio or a low yield. Such methods using impure NAD kinase are not useful for commercial production of NADP. But on the other hand, it is, in practice, quite difficult to obtain NAD kinase in sufficiently high purity to produce commercially high yields of NADP.

BREIF DESCRIPTION OF THE INVENTION

It has now been discovered that the phosphotase difficulty can be eliminated by pretreating NAD kinase with an acid and/or by carrying out the reaction in the presence of a soluble fluoride, in addition to the NAD kinase. It has also been discovered that the conversion activity of NAD kinase can be also significantly enhanced by carrying out the reaction in the presence of an SH-reagent, in addition to NAD kinase. Each of these means can be applied in and of itself to improve the efficiency or the production yield on the starting material, if desired. However, even better results can be obtained by the combined use of two or more of these means, and especially good results can be obtained by carrying out the reaction in the presence of an acid pretreated NAD kinase together with with a fluoride and an SH-reagent.

An object of the present invention is to provide processes for producing NADP by the reaction of NAD with ATP in the presence of NAD kinase.

Another object of the present invention is to provide processes for producing NADP by the reaction of NAD with ATP in the presence of a crude NAD kinase.

A further object of the present invention is to provide processes for producing NADP by the reaction of NAD with ATP in the presence of an NAD kinase-containing substrate obtained by fermentation.

DETAILED DESCRIPTION OF THE INVENTION

In accordance with the present invention, there is provided a process for producing NADP by the reaction of NAD with ATP in the presence of NAD kinase, and in which the reaction is conducted in the further presence of a fluoride and/or an SH-reagent, alternatively; or in combination, or the reaction is conducted in the presence of NAD kinase that has been pretreated with an acid.

Especially good results can be obtained when the reaction is conducted in the presence of an acid-pretreated NAD kinase together with a fluoride and an SH-reagent.

The reaction of NAD with ATP is carried out in general at a pH of from 4 to 8 (preferably 6–7.5) and at a temperature of from 35° to 43° C (preferably from 36° to 38° C) for 1 to 24 hours.

After the completion of the reaction, the NADP produced thereby is recovered from the reaction solution by means well known in the art, for example by absorption and subsequent elution from a column utilizing a strongly acidic ion exchange resin and a strongly basic ion exchange resin in combination.

Adding a fluoride in the reaction system or pretreating the NAD kinase with acid inhibits the undesirable phosphotase completely. Any fluoride which does not harm the reagents and products of the reaction may be used, but it is preferred to use such fluorides as sodium fluoride, ammonium fluoride and the like, in concentrations of from 5 to 200 mM (preferably from about 50 to 150 mM) in the reaction mixture.

By addition of an SH-reagent in the reaction system, it is possible to enhance and stabilize the activity of NAD kinase significantly. Preferable SH-reagents include for example cysteine, glutathione and the like, so long as the sulf-hydral radical is present therein. The desired concentration of SH-reagent present in the reaction is from $1 \times 10^{-3}$ to $1 \times 10^{-2}M$ (preferably from about $3 \times 10^{-3}M$ to $5 \times 10^{-3}M$).

When crude NAD kinase is pretreated with an acid, any mineral acid which does not harm the reagents of the process may be used. However mineral acids are preferred and they are exemplified by hydrochloric acid, sulfuric acid and the like. When the acid treatment is used the enzyme containing material is adjusted to a pH of from about 3 to 6 prior to use in the reaction. The acid-treated NAD kinase may be used alone or in combination with a fluoride and/or an SH-reagent as noted above.

According to the present invention it is not necessary to use a highly purified NAD kinase, but an unpurified crude enzyme may be used. It is thus possible to use a substrate of NAD kinase, for example, cultured liquor, or microbial cells separated from the cultured liquor or a cell suspension prepared therefrom, which materials also contain various other impurities. In this case, any microorganism having an activity on NAD kinase may be used. Preferable microorganisms are exemplified by *Brevibacterium ammoniagenes* ATCC 6872, *Saccharomyces cerevisiae* ATCC 15248, *Saccharomyces cerevisiae* ATCC 7754, *Arthrobacter citreus* ATCC 11624, *Arthrobacter ureafaciens* ATCC 7562, *Corynebacterium rathayi* ATCC 13659, *Micrococcus varians* ATCC 399, *Serratia marcescens* ATCC 19180, *Candida utilis* ATCC 9950, etc.

These microorganisms are cultured in conventional manner by using a medium containing carbon sources (such as organic acids, hydrocarbons, saccharine materials e.g. glucose, sucrose); organic nitrogen sources (such as natural nitrogen sources e.g. peptone, meat extract; glutamic acid etc.), and inorganic nitrogen sources, e.g. ammonia, ammonium sulphate, etc.; phosphate sources such as potassium monohydrogen phosphate, potassium dihydrogen phosphate etc.; magnesium sulphate; and metal ions (such as iron, manganese, zinc, calcium etc.). If desired, it is also possible to add to the medium suitable amounts of special substances required for growth of the particular microorganism to be used.

In any event, the microorganism is cultured under aerobic conditions, for example, by shaking, or by submerged culturing with aeration and agitation etc. Such culturing is normally carried out at a temperature of from 20° to 40° C (preferably from 28° to 37° C) and at a pH of from 5.5 to 9 (preferably 7 to 8). The culturing is continued in order to accumulate NAD kinase in the medium and cell bodies (hereinafter designated as cultured liquor) preferably for 6 to 48 hours. The thus-obtained cultured liquor is then utilized in the synthesis reaction with or without acid-pretreatment according to the present invention.

It is also possible to separate the microbial cells from the cultured liquor for use in the reaction. And it is also possible to prepare a suspension of such cells preferably as an aqueous suspension thereof.

In the event NAD kinase is pretreated with an acid, dilute mineral acid such as hydrochloric acid or sulfuric acid is added to the cultured liquor to adjust the pH to from 3 to 6 and the liquor is then preferably stirred for 1 to 24 hours before use. The enzyme containing material may be used for the reaction as long as it exhibits NAD kinase activity.

The microbial cells can also be separated from the cultured liquor for use, in which case it is preferred to pretreat the cultured liquor with a mineral acid as noted above and the separation is preferably effected by centrifugation. The separated cell bodies are resuspended in water. In some instances, as noted below, the separation is carried out without acid-pretreatment of the cultured liquor.

These substrates containing NAD kinase can be used for the reaction without any purification. The enzyme containing suspension or cultured liquor is added to NAD and ATP and the pH of the reaction mixture is then adjusted to a pH of from about 4 to 8, as for example, by addition of caustic soda solution thereto.

Although any NAD kinase enzyme containing substrate, even those prepared by other methods than the fermentation methods herein described, may be used for the purpose of the present invention, it is advantageous to use enzyme sources obtained by fermentation, since such sources present a ready source of the desired enzyme necessary for continuous production of NADP. In this regard, the following nonlimitative examples illustrate the production of such enzyme sources obtained by fermentation, and the preparation of NADP therefrom.

EXAMPLE 1

*Brevibacterium ammoniagenes* ATCC 6872 was cultured in a medium comprising glucose (14 percent), meat extract (0.6 percent), L-cysteine (20 mg/ml), β-alanine (15 mg/ml), calcium chloride (0.01 percent and manganese (45 λ/ml) at a pH of 7.5 and at a temperature of 30° C with agitation (300 r.p.m.) for 36 hours. After the completion of the cultivation, the cultured liquor was adjusted to pH 4 with hydrochloric acid and was permitted to stand for 3 hours for acid-pretreatment. The microbial cells were then separated from the cultured liquor by centrifugation and were suspended in water at a concentration of about 20 mg/ml (calculated as dried cell weight). To this solution was added caustic soda solution to give a pH of 7.5 and 4 mg/ml of NAD and 4 mg/ml of ATP were added and the reaction carried out at a temperature of 37° C for 6 hours. 0.8 mg/ml of NADP was formed in the reaction solution.

EXAMPLE 2

A similar cultivation and reaction to that described in Example 1 was carried out with the exception that 4 mg/ml of sodium fluoride was added to the NAD-ATP reaction mixture. 1.5 mg/ml of NADP was formed in the reaction solution.

EXAMPLE 3

A similar reaction to that described in Example 1 was carried out except 4 mg/ml of ammonium fluoride and 0.5 mg/ml of cysteine were added to the NAD-ATP reaction mixture. 2.2 mg/ml of NADP was formed in the reaction solution.

EXAMPLE 4

*Brevibacterium ammoniagenes* ATCC 6872 was cultured in a similar manner to that described in Example 1. In this instance however, the acid-pretreated cultured liquor was mixed with 4 mg/ml of NAD, 4 mg/ml of ATP, 4 mg/ml of ammonium fluoride and 0.5 mg/ml of cysteine. Then, the pH was adjusted to 7.5 by adding caustic soda solution as needed and the reaction was carried out at 37° C for 6 hours. 0.5 mg/ml of NADP was produced in the reaction solution.

EXAMPLE 5

*Brevibacterium ammoniagenes* ATCC 6872 was cultured under similar conditions to those described in Example 1 for 36 hours and was centrifugated, without acid-pretreatment, to separate microbial cells. The separated cells were suspended in water at a concentration of about 20 mg/ml (calculated as dried cell weight). To this suspension 4 mg/ml of NAD, 4 mg/ml of ATP, 4 mg/ml of sodium fluoride and 0.50 mg/ml of cysteine were added and the pH was adjusted to 7.5 by using caustic soda solution. The reaction was carried out at 37° C for 6 hours to yield 1.1 mg/ml of NADP in the reaction solution.

EXAMPLE 6

*Saccharomyces cerevisiae* ATCC 15248 was cultured in a medium containing molasses (8 percent), ammonium sulfate (0.2 percent), urea (0.5 percent), and ammonium phosphate (0.2 percent) at a pH of 5.5 and at a temperature of 30° C for 20 hours under aerobic conditions to yield a cultured liquor. After adjusting the pH to 4.0 by adding sulfuric acid, the cultured liquor was centrifugated to separated microbial cells which were suspended in water in a concentration of 100 mg/ml (calculated as dried cell weight). To this suspension were added 4 mg/ml of cysteine, and the pH was adjusted to 7.5 by adding caustic soda. The reaction was carried out at a temperature of 37° C for 6 hours, and yielded 0.25 mg/ml of NADP.

EXAMPLE 7

A similar reaction to that described in Example 6 was carried out except that *Saccharomyces cerevisiae* ATCC 7754 was substituted for *Saccharomyces cerevisiae* ATCC 15248. NADP was yielded in an amount of 0.13 mg/ml.

EXAMPLE 8

A similar process to that described in Example 1 was carried out, except that cysteine (0.5 mg/ml) was added to the reaction solution. The yield was 0.85 mg/ml NADP.

EXAMPLE 9

In separate runs each of the microorganisms listed below was cultured for 36 hours in a manner similar to that described in Example 1. The respective fermented liquors were centrifuged to separate cell body fractions. Each fraction was suspended in water to give a cell suspension containing cell bodies of about 20 mg/ml (calculated as dried cell weight). To the cell suspension was added 4 mg/ml of NAD, 4 mg/ml of ATP and 4 mg/ml of NaF and 0.5 mg/ml of cysteine, and the pH was then adjusted to 7.5 by adding caustic soda. Each reaction was carried out at 37° C for 6 hours to obtain the results as follows:

| Strain Utilized | Amount of NADP formed in the reaction solution (mg/ml) |
| --- | --- |
| Arthrobacter citreus ATCC 11624 | 0.26 |
| Arthrobacter ureafaciens ATCC 7562 | 0.75 |
| Corynebacterium rathayi ATCC 13659 | 0.82 |
| Micrococcus varians ATCC 399 | 0.12 |
| Serratia marcescens ATCC 19180 | 0.32 |
| Candida utilis ATCC 9950 | 0.64 |

EXAMPLE 10

Each of the below listed microorganisms was cultured and treated in a similar manner to that described in Example 9 with the exception that sulfuric acid was used for adjusting the pH of the cultured liquor to 4.0. The results obtained were as follows:

| Strain Utilized | Amount of NADP formed in the reaction solution (mg/ml) |
| --- | --- |
| Arthrobacter citreus ATCC 11624 | 0.75 |
| Arthrobacter ureafaciens ATCC 7562 | 1.20 |
| Corynebacterium rathayi ATCC 13659 | 0.95 |
| Micrococcus varians ATCC 399 | 0.32 |
| Serratia marcescens ATCC 19180 | 0.45 |
| Candida utilis ATCC 9950 | 0.93 |

EXAMPLE 11

A similar treatment to that described in Example 1 was carried out without acid-treatment to give a cell suspension, to which NAD, ATP and sodium fluoride (each 4 mg/ml) were added. After adjusting the pH of the cultured liquor to 7.5 with caustic soda, the reaction was carried out at 37° C for 6 hours to obtain 1.0 mg/ml of NADP in the reaction solution.

The above examples merely illustrate the process of the invention and are not intended to limit the same since it will be obvious that various modifications may be made thereto without departing from the spirit of the invention as defined in the foregoing specification. All such variations are contemplated herein to the extent they fall within the limits of the claims as set forth below.

What is claimed is:

1. A process for producing nicotinamide adenine dinucleotide phosphate comprising reacting nicotinamide adenine dinucleotide with adenosine triphosphate in the presence of a fluoride or an SH-reagent selected from the group consisting of cysteine and glutathione and a mixture of fluoride and SH-reagents and in the presence of acid pretreated nicotinamide adenine dinucleotide kinase containing material selected from the group consisting of microbial cells, microbial cultured liquor and a microbial cell suspension, pretreated kinase containing material having been pretreated with an acid at a Ph of about 3 to 6 for a time sufficient to inhibit phosphatase contained therein.

2. The process of claim 1 wherein the pretreating acid is mineral acid.

3. The process of claim 1 wherein the reaction is carried out in the presence of a fluoride which is in a concentration of from about 5 to 200 mM.

4. The process of claim 1 wherein the reaction is carried out in the presence of said SH-reagent which is in a concentration of from about $1 \times 10^{-3}$ to $1 \times 10^{-2}$M.

5. The process of claim 1 wherein the reaction is carried out in the presence of a mixture of a fluoride and said SH-reagent.

6. The process of claim 1 wherein the reaction is carried out at a pH of from about 4 to 8 and at a temperature of from about 35° to 43° C.

7. The process of claim 3 wherein the reaction is carried out at a pH of from about 4 to 8 and at a temperature of from about 35° to 43° C.

8. The process of claim 4 wherein the reaction is carried out at a pH of from about 4 to 8 and at a temperature of from about 35° to 43° C.

9. The process of claim 5 wherein the reaction is carried out at a pH of from about 4 to 8 and at a temperature of from about 35° to 43° C.

10. The process of claim 3 wherein the fluoride is selected from the group consisting of sodium fluoride and ammonium fluoride.

11. The process of claim 1 wherein the nicotinamide adenine dinucleotide kinase containing material is cultured from a microorganism selected from the group consisting of Brevibacterium ammonigenes ATCC 6872. Saccharomyces cerevisiae ATCC 15248 and ATCC 7754, Arthrobacter citreus ATCC 11624, Arthrobacter ureafaciens ATCC 7562, Corynebacterium rathayi ATCC 13659, Micrococcus varians ATCC 399, Serratia marcescens ATCC 19180, and Candida utilis ATCC 9950.

12. The process of claim 3 wherein the nicotinamide adenine dinucleotide kinase containing material is cultured from a microorganism selected from the group consisting of Brevibacterium ammonigenes ATCC 6872, Saccharomyces cerevisiae ATCC 15248 and ATCC 7754, Arthrobacter citreus ATCC 11624, Arthrobacter ureafaciens ATCC 7562, Corynebacterium rathayi ATCC 13659, Micrococcus varians ATCC 399, Serratia marcescens ATCC 19180, and Candida utilis ATCC 9950.

13. The process of claim 5 wherein the fluoride is in a concentration from about 5 to 200 mM and the SH-reagent is in a concentration from about $1 \times 10^{-3}$ to $1 \times 10^{-2}$M.

14. A process for producing nicotinamide adenine dinucleotide phosphate comprising reacting nicotinamide adenine dinucleotide with adenosine triphosphate in the presence of (1) a substance having NAD-kinase activity selected from the group consisting of a microbial cultured liquor, microbial cells separated from said cultured liquor or a microbial cell suspension of a microorganism selected from the group consisting of the genus Brevibacterium, Arthobacter, Corynebacterium, Micrococcus, Seratia, Candida, and Saccharomyces, and (2) a fluoride in a concentration of from about 5 to 200 mM.

15. A process for producing nicotinamide adenine dinucleotide phosphate comprising reacting nicotinamide adenine dinucleotide with adenosine triphosphate in the presence of (1) of a substance having NAD-kinase activity selected from the group consisting of a microbial cultured liquor, microbial cells separated from said cultured liquor or a microbial cell suspension of a microorganism selected from the group consisting of the genus Brevibacterium, Arthrobacter, Corynebacterium, Micrococcus, Seratia, Candida, and Saccharomyces, (2) a fluoride in a concentration of from about 5 to 200 mM, and (3) either cysteine or glutathione in a concentration of from about $1 \times 10^{-3}$ to $1 \times 10^{-2}$M.

* * * * *